(12) United States Patent
Costante

(10) Patent No.: US 6,678,151 B2
(45) Date of Patent: Jan. 13, 2004

(54) MODULE FOR HIGH- AND MEDIUM-VOLTAGE ELECTRIC STATION

(75) Inventor: Piazza Costante, Lodi (IT)

(73) Assignee: ABB Service S.r.l., Milan (IT)

( * ) Notice: Subject to any disclaimer, the term of this patent is extended or adjusted under 35 U.S.C. 154(b) by 0 days.

(21) Appl. No.: 10/220,953

(22) PCT Filed: Feb. 26, 2001

(86) PCT No.: PCT/EP01/02318

§ 371 (c)(1),
(2), (4) Date: Sep. 6, 2002

(87) PCT Pub. No.: WO01/69740

PCT Pub. Date: Sep. 20, 2001

(65) Prior Publication Data

US 2003/0029842 A1 Feb. 13, 2003

(30) Foreign Application Priority Data

Mar. 10, 2000 (IT) ................................. MI2000A0490

(51) Int. Cl.[7] ................................................. H02B 5/00
(52) U.S. Cl. ........................ 361/602; 200/7; 200/48 R; 200/48 P; 218/45; 218/154; 361/603
(58) Field of Search .............................. 200/48 R, 48 P, 200/48 A, 48 KB, 485 B, 484; 218/7, 45, 57, 84, 40, 92, 153–154; 361/600–604, 620, 623, 663, 836, 679

(56) References Cited

U.S. PATENT DOCUMENTS 3,566,055 A * 2/1971 Weston ..................... 200/48 R
4,200,899 A * 4/1980 Volman et al. ............. 361/602
4,752,859 A * 6/1988 Chabala et al. ............ 361/602
5,764,472 A * 6/1998 Schuld ...................... 361/602

FOREIGN PATENT DOCUMENTS

GB  1283992  8/1972

* cited by examiner

Primary Examiner—Gregory Thompson
(74) Attorney, Agent, or Firm—Connolly Bove Lodge & Hutz LLP; Larry J. Hume

(57) ABSTRACT

A module comprising: a supporting frame, having a fixed and a movable part; first actuator for wiring the movable part; first and second sets of three insulating posts, arranged on the fixed part along two corresponding rows; first and second disconnection contacts being respectively associated with the insulating posts and being electrically connectable to the module, to corresponding electric terminals. The module comprises a set of three multifunctional interruption assemblies, each of which comprises:

- a supporting insulator, on the movable part and connected in an elbow-shaped configuration to a containment insulator which contains an interruption unit having a fixed movable contact which is operatively connected to second actuation means;
- third and fourth disconnection contacts, which are electrically connected to the interruption unit and are connected to the first and second disconnection contacts, respectively. Further, the first and/or second actuator comprises a motor with position control.

20 Claims, 2 Drawing Sheets

MODULE FOR HIGH- AND MEDIUM-
VOLTAGE ELECTRIC STATION

DESCRIPTION

The present invention relates to a module for a high- and medium-voltage electric station, i.e. for applications with operating voltages above 1000 V; more particularly, the present invention relates to a module for an electric station which distinguishes itself with respect to known types of device due to the simplicity, compactness and modularity of its constructive structure and is accordingly extremely flexible in application and significantly convenient from an economic point of view.

It is known from the art that air-insulated high- and medium-voltage electric stations use a system of busbars, each of which is appropriately connected to a main electric power supply line and to a power transformer; the substation is furthermore provided with a series of primary components, for example disconnectors, circuit breakers, instrument transformers, et cetera, and secondary components, such as busbar protections, maximum-current protections, and control systems.

According to a conventional embodiment, the stations are produced by assembling the various components directly on site, generally arranging them on mutually separate supports. This solution entails a considerable use of labor at the installation site for assembly, adjustment and electrical testing. This solution furthermore entails the use of considerable space, which leads to an increase in the costs required for the purchase of land and, in view of the large number of foundations and supports required, to an increase in construction difficulties, especially when the space available is limited and/or the preparation of the foundations is rendered difficult by the very nature of the soil; furthermore, the environmental impact is considerably negative. If one wishes to avoid performing electrical testing at the installation site, it is necessary to oversize the insulation distances for safety reasons and therefore oversize accordingly the entire station.

Constructive solutions are also known which use apparatuses which integrate multiple electrical functions in a single component. An example of this type is described in European patent application no. 0774814. Another known type of solution associates with each interruption pole a two-blade disconnector and performs the disconnection maneuvers by turning said pole; conventional instrument transformers can furthermore be optionally integrated in the structure of the pole. Although these solutions adequately achieve the required electrical performance and allow a reduction of the required supports with respect to more conventional solutions, they still require assembly directly at the installation site, with the same drawbacks noted above. Furthermore, the interruption poles are generally constituted by shaft-like insulators which are constituted by two parts: a first one, commonly known as supporting insulator, inside which the means for actuating the contacts of the circuit breaker are arranged, and a second one, which is arranged in the upper part of the pole and contains the interruption elements. Accordingly, visual impact is still considerable, also in view of the fact that the constructive dimensions increase as the voltage involved increases; any use of conventional instrument transformers inside the pole contributes to an increase in space occupation and visual impact.

Another considerable drawback of known types of solution is the fact that the electrical maneuvers are generally performed by means of mechanical actuation devices which have a large number of components and require long and complicated adjustments; furthermore, the movement of the moving parts, particularly of the movable contacts, cannot be changed by the user but is set during design. This lack of control furthermore requires the presence of damping elements or shock absorbers in order to dissipate the residual kinetic energy at the end of the maneuver and avoid uncontrolled impacts. Furthermore, due to the large number of components, frequent maintenance interventions are required in order to maintain nominal behavior and therefore ensure repeatability of maneuvers.

Alternatively, actuation devices of the hydraulic type are used which can partly obviate these drawbacks but have inherent limitations linked to the presence of fluids, especially as a consequence of their temperature-sensitivity.

The aim of the present invention is to provide a module for a high- and medium-voltage electric station whose structure allows to perform assembly and technical testing directly at the factory, thus allowing transport to the site in a configuration which is already preset for the operative placement.

Within the scope of this aim, an object of the present invention is to provide a module for a high- and medium-voltage electric station which has a multifunctional structure in which electrical maneuvers can be performed simply and effectively, allowing accuracy and repeatability of said maneuvers, and a significant reduction in the space required with respect to the state of the art.

Another object of the present invention is to provide a module for a high- and medium-voltage electric station which has a compact and modular structure which allows to reduce environmental visual impact and installation costs.

A further object of the present invention is to provide a module for a high- and medium-voltage electric station which is highly reliable, relatively easy to manufacture and at competitive costs.

This aim, these objects and others which will become apparent hereinafter are achieved by a module for a high- and medium-voltage electric station, comprising: a supporting frame, which has a fixed part and a movable part; first actuation means, which are suitable to move said movable part; a first and a second sets of three insulating posts, arranged on the fixed part along two corresponding rows; first and second disconnection contacts being respectively associated with the insulating posts of said first and second sets and being electrically connectable, in input and in output with respect to the module, to corresponding electric terminals; characterized in that it comprises a set of three multifunctional interruption assemblies, each of which comprises:

a supporting insulator, arranged on said movable part and connected in an elbow-shaped configuration to a containment insulator, said containment insulator containing at least one interruption unit which has a fixed contact and a movable contact which is operatively connected to second actuation means;

third and fourth disconnection contacts, which are electrically connected to said interruption unit and are connected, in a disconnectable way, to said first and second disconnection contacts, respectively; the actuation of said movable part producing a movement of the multifunctional assemblies between a first position, in which the third and fourth disconnection contacts are respectively connected to the corresponding first and second disconnection contacts, and a second position, in which they are disconnected therefrom; and in that said first and/or second actuation means comprise a motor with position control.

In this manner, one obtains an extremely compact module in which electrical maneuvers are performed very simply and effectively, at the same time ensuring their accuracy and repeatability. Furthermore, the module according to the invention has a constructive structure which makes it directly transportable to the installation site in an already preassembled configuration, with an installation and supporting frame layout which considerably reduces the space required and at the same time reduces the number of foundations and supports required and also reduces environmental impact.

Further characteristics and advantages of the invention will become apparent from the description of preferred but not exclusive embodiments of the module according to the invention, illustrated only by way of non-limitative example in the accompanying drawings, wherein.

Figure 1:
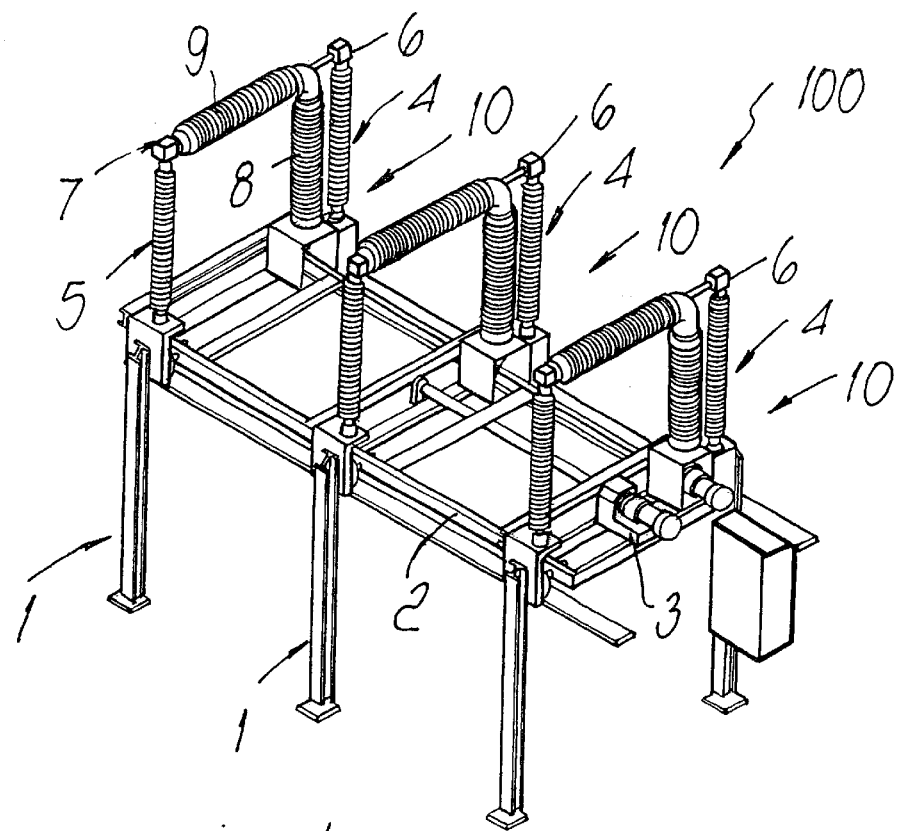
FIG. 1 is a perspective view of the module for a high- and medium-voltage electric station according to the invention.
Figure 2:
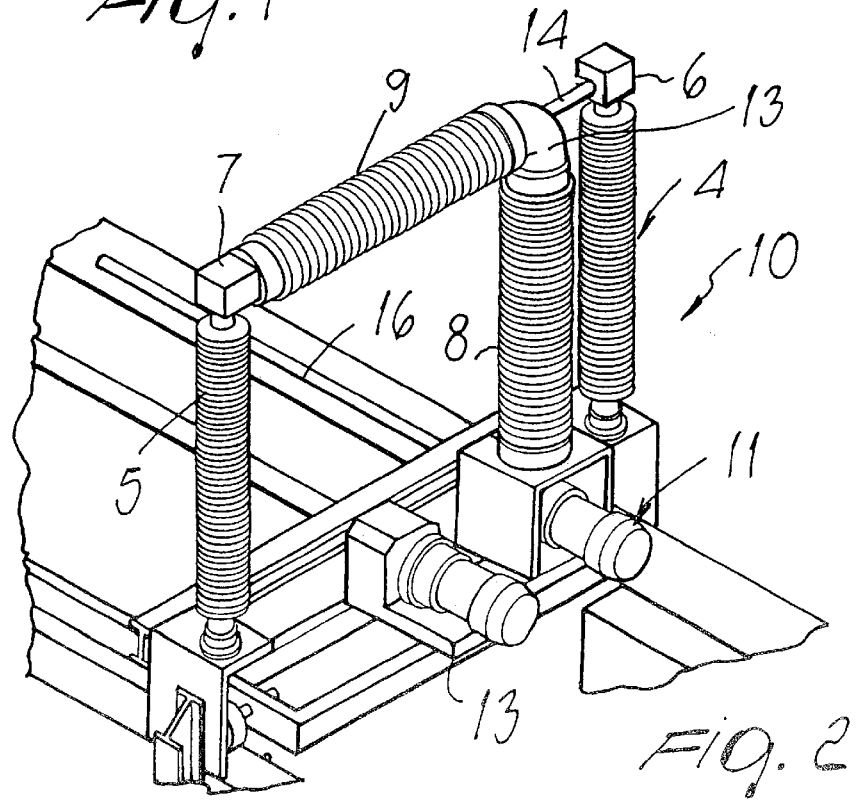
FIG. 2 is a detailed perspective view of a part of the module of FIG. 1.

With reference to the above cited figures, the module for a high- and medium-voltage electric station according to the invention, generally designated by the reference numeral 100, comprises a supporting frame which has a fixed part 1 and a movable part 2 with which first actuation means are associated, the first actuation means being suitable to move said movable part 2. Advantageously, the first actuation means comprise a kinematic chain and a motor with position control 3, preferably a rotary servomotor, for the purposes detailed hereinafter.

A first set 4 and a second set 5 of three insulating posts are arranged on the fixed part 1 of the frame and are aligned along two corresponding rows; first disconnection contacts 6 and second disconnection contacts 7 are respectively associated with each insulating post 4 and with each insulating post 5 and can be electrically connected, in input and in output with respect to the module, to corresponding electrical terminals, not shown. Said disconnection contacts 6 and 7, for example of the clamp type, can be respectively connected to the phases of an electric power supply line and to busbars; numerous alternative connection configurations can be easily provided in practice.

The module 100 furthermore has a set of three multifunctional interruption assemblies, designated by the reference numeral 10, each of which comprises a supporting insulator 8, which is arranged substantially vertically on the movable part 2 and is transversely connected, in an elbow-shaped configuration, to a containment insulator 9. Advantageously, each supporting insulator 8 is connected to the corresponding containment insulator 9 by interposing a single metallic collar 13; alternatively, it is possible to use multiple intermediate components, according to conventional solutions which are widely known in the art.

Inside each containment insulator 9 there is at least one interruption unit, i.e. a high-voltage circuit breaker, which comprises an interruption chamber arranged substantially horizontal, a dielectric fluid, for example $SF_6$, a fixed contact and a movable contact, according to embodiments which are widely known in the art and accordingly are not illustrated.

The movable contact is operatively connected to second actuation means.

Figure 3:
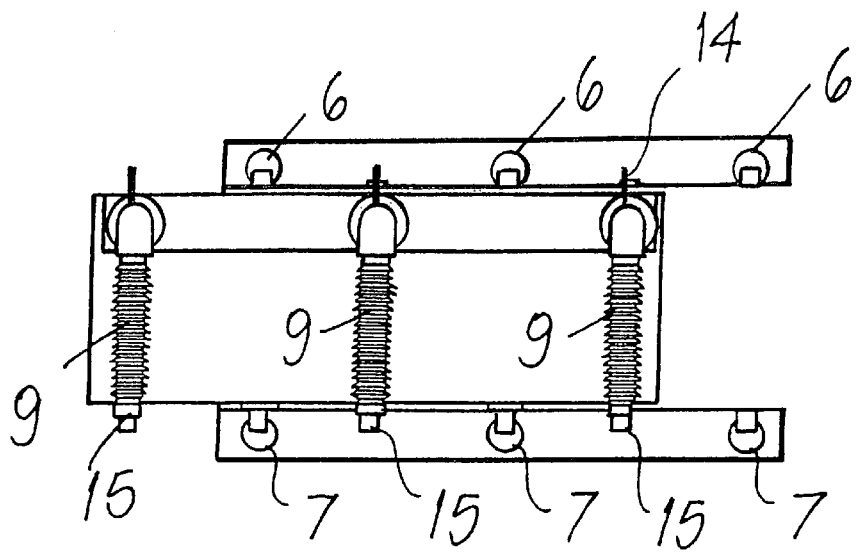
FIG. 3 is a top view of the module according to the invention in a disconnection position.

Each multifunctional assembly 10 furthermore comprises third disconnection contacts 14 and fourth disconnection contacts 15, for example of the blade type, which are electrically connected to the interruption unit and are connected, in a separable way, respectively to the first disconnection contacts 6 and to the second disconnection contacts 7. In practice, the movement of the movable part 2 determines a movement of the multifunctional assemblies 10 between a first position, in which the third disconnection contacts 14 and the fourth disconnection contacts 15 are respectively connected to the corresponding first disconnection contacts 6 and to the second disconnection contacts 7, and a second position, shown in FIG. 3, in which they are disconnected from them.

Advantageously, the movement of the movable part 2 occurs by means of the servomotor 3 and the use of a worm screw 12 which is suitable to convert the rotary motion of the shaft of the servomotor 3 into a translation movement of said movable part 2. For example, the movable part can be provided with wheels which slide in rails provided in the fixed part 1.

In this way, the disconnection maneuvers occur in a functionally effective manner and according to a simple constructive solution which allows to reduce the components required and the corresponding space occupations.

Advantageously, the second actuation means also comprise a motor with position control 11, preferably a rotary servomotor. In this case, the servomotor is connected to the movable contact of the interruption unit by virtue of a kinematic chain which is suitable to convert the rotary motion of the servomotor shaft into a translation movement of the movable contact; embodiments of said kinematic chains are widely known in the art and accordingly are not described in detail.

In particular, according to a preferred embodiment, the module 100 can comprise a single motor 11 connected to the movable contacts of the three interruption units, for example by means of a connecting rod 16, as shown in FIGS. 1 to 4; alternatively, it is possible to use three different motors 11, each of which is connected to a corresponding interruption unit.

Furthermore, according to an embodiment which is not shown, it is possible to use a single motor with position control, operatively connected to the movable contacts of the interruption units and to the movable part 2; in this manner, with a single motor it is possible to perform both interruption and disconnection maneuvers, according to a solution which allows to further reduce the components used and accordingly reduce costs and space occupation.

The use of a motor with position control, and particularly of a rotary servomotor, allows to ensure accuracy and repeatability of the interruption and disconnection maneuvers, with a constructive solution which is simplified with respect to the actuation means of the known art; accordingly, the dimensions are also reduced. The use of a servomotor allows to have considerable power levels available with short delivery times.

Position control can be performed, both for the motor 3 and for the motor 11, by means of a position sensor located on the motor, which sends to a control unit information related to the movement of said motor. Position control, particularly for the interruption maneuvers, can also be performed by a movable contact position sensor which sends to the control unit information related to the actual position of the movable contact. Said position sensor can be simply a stroke limit device which signals to the control unit that the requested maneuver has been completed.

By means of the control unit it is in fact possible, for example, to program in a simple and flexible manner the rule of motion of the moving parts according to the actuation and to the type of fault possibly detected. In particular, it is possible to predefine the positioning precision of the movable contact of the interruption units both for opening and for closure, reducing the risks of damage currently linked to overrun problems.

The module 100 furthermore comprises instrument transformers, not shown. In particular, according to a preferred embodiment, the module 100 comprises optical current sensors, each arranged inside a corresponding interruption unit. Preferably, the optical current sensors are arranged inside the volume of the interruption unit occupied by the dielectric fluid, for example in the interruption chamber, more preferably proximate to the fixed contact or movable contact.

Possible embodiments of said optical sensors are described in detail in International patent application no. PCT/EP99/05750, the description of which is assumed included herein by reference.

The use of an optical current sensor allows to accurately measure the current that flows in each pole, avoiding the non-ideal conditions that are typical of conventional magnetic-core current transformers. Furthermore, placement inside the volume occupied by the dielectric fluid, and particularly in the interruption chamber, allows to considerably reduce space occupation and facilitate placement operations, especially when the sensor is located proximate to the contacts.

Another advantage is provided by the fact that at least inside one set of three insulating posts, for example in the insulating posts 5, it is possible to use voltage transformers, preferably constituted by optical voltage sensors; in this manner, the module also integrates a function for measuring the voltage involved, according to a solution which occupies substantially no space, since the sensor is arranged inside the insulating posts.

Figure 4:
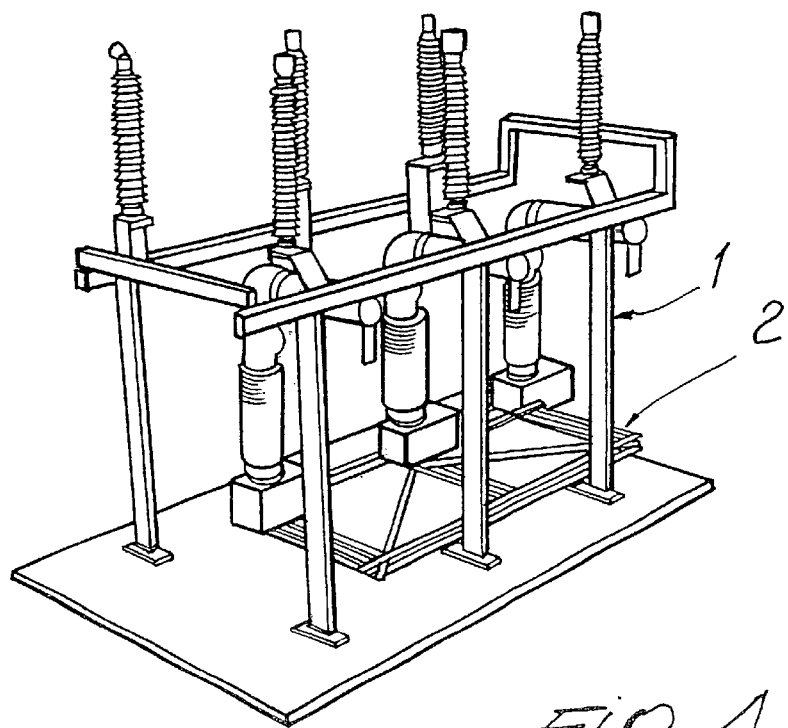
FIG. 4 is a perspective view of the movable part of the module according to the invention, shown separated from the fixed part.

Another advantage of the module 100 according to the invention is the fact that the assembly constituted by the movable part 2 and the interruption units 10 can be moved both substantially horizontally, as described earlier for the execution of the disconnection maneuvers, and substantially vertically, as shown schematically in FIG. 4, with respect to the fixed part 1. In this manner, for example, the execution of any maintenance is facilitated; furthermore, the movable part of the module constitutes a core which can be easily removed from the fixed part in case of total or partial replacement of components.

Another advantage is provided by the fact that the insulating posts 4 and 5, the supporting insulators 8 and the containment insulators 9 have a substantially tubular body made of polymeric material, around which silicone rubber fins are arranged. This solution provides an overall weight reduction of the module with respect to the use of conventional insulators, for example ceramic ones, and improves dielectric strength, particularly in polluted working environments. Furthermore, the insulating posts of at least one of the two sets of three can be provided so as to comprise surge arresters.

The module 100 according to the invention is particularly suitable to be used in the realization of high- and medium-voltage electric substations. Accordingly, the present invention also relates to a high- and medium-voltage electric substation, characterized in that it comprises a module according to the present invention.

In practice it has been found that the module according to the invention fully achieves the intended aim, since it has a simple and compact structure, in which the electrical maneuvers are performed extremely simply and effectively, at the same time ensuring their accuracy and repeatability. Furthermore, the module has a constructive structure which makes it directly transportable to the installation site in an already preassembled configuration, with an installation and supporting frame layout which considerably reduces the space required, at the same reducing the number of foundations and supports required and the corresponding environmental impact. Particularly by virtue of its easy transportability, the module 100 is particularly suitable for the provision of mobile high- and medium-voltage electric substations.

The module thus conceived is susceptible of numerous modifications and variations, all of which are within the scope of the inventive concept; all the details may furthermore be replaced with other technically equivalent elements. In practice, the materials used, so long as they are compatible with the specific use, as well as the dimensions, may be any according to the requirements and the state of the art.

What is claimed is:

1. A module for a high-and medium-voltage electric station, comprising: a supporting frame, which has a fixed part and a movable part; first actuation means, which are suitable to move said movable part; a first and a second sets of three insulating posts, arranged on the fixed part along two corresponding rows; first and second disconnection contacts being respectively associated with the insulating posts of said first and second sets and being electrically connectable, input and in output with respect to the module, to corresponding electric terminals; characterized in that said module comprises a set of three multifunctional interruption assemblies, each of which comprises:
  a supporting insulator, arranged on said movable part and connected in an elbow-shaped configuration to a containment insulator, said containment insulator containing at least one interruption unit which has a fixed contact and a movable contact which operatively connected to a second actuation means;
  third and four disconnection contacts, which are electrically connected to said interruption unit and are connected, in a disconnectable way, to said first and second disconnection contacts, respectively; the actuation of said movable part producing a movement of the multifunctional assemblies between a first position, in which the third and fourth disconnection contacts are respectively connected to the corresponding first and second disconnection contacts, and a second position, in which they are disconnected therefrom; and in that said first and/or second actuation means, comprise a motor with position control.

2. The module for a high- and medium-voltage electric station according to claim 1, characterized in that said first actuation means comprise a kinematic chain and wherein said motor with position control comprises a rotary servomotor.

3. The module for a high- and medium-voltage electric station according to claim 2, characterized in that said kinematic chain comprises a worn screw which is suitable to convert the rotary motion of the shaft of the servomotor into a translating movement of said movable part of the supporting frame.

4. The module for a high- and medium-voltage electric station according to claim 1, characterized in that said second actuation means comprise a kinematic chain and wherein said motor with position control comprises a rotary servomotor.

5. The module for a high- and medium-voltage electric station according to claim 4, characterized in that said rotary servomotor comprises a single rotary servomotor which is operatively connected to the movable contacts of the interruption assemblies.

6. The module for a high- and medium-voltage electric station according to claim 4, characterized in that said rotary servomotor comprises a set of three rotary servormotors, each of which is operatively connected to the movable contact of the corresponding interruption assembly.

7. The module for a high- and medium-voltage electric station according to claim 1, characterized in that instrument transformers are arranged inside said interruption assemblies.

8. The module for a high- and medium-voltage electric station according to claim 7, characterized in that said instrument transformers comprise an optical current sensor which is arranged inside said interruption assemblies.

9. The module for a high- and medium-voltage electric station according to claim 8, characterized in that said optical sensor is arranged inside a volume of the interruption assemblies which is occupied by a dielectric fluid.

10. The module for a high- and medium-voltage electric station according to claim 9, characterized in that said optical current sensor is arranged inside the interruption chamber proximate to one of the contacts.

11. The module for a high- and medium-voltage electric station according to claim 1, characterized in that at least one optical voltage sensor is arranged inside at least one of said first or second set of three insulating posts.

12. The module for a high- and medium-voltage electric station according to claim 1, characterized in that the assembly constituted by the movable part and the interruption assemblies can move both substantially horizontally and substantially vertically.

13. The module for a high- and medium-voltage electric station according to claim 1, characterized in that the supporting insulators are connected to the corresponding containment insulators by means of a single metallic collar, said insulators and said containment insulators comprising a substantially tubular body made of polymeric material, around which silicone rubber fins are arranged.

14. The module for a high- and medium-voltage electric station according to claim 1, characterized in that said first and second sets of three insulating posts comprise a substantially tubular body made of polymeric material, around which silicone rubber fins are arranged, at least one of said first and second sets of three insulating posts comprising a surge arrester.

15. A high- and medium-voltage electrical substation, characterized in that it comprises a module according to claim 1.

16. A high- and medium-voltage mobile electrical substation, characterized in that it comprises a module according to claim 1.

17. The module for a high- and medium-voltage electric station according to claim 2, characterized in that at least one optical voltage sensor is arranged inside at least one of said first or second set of three insulating posts.

18. The module for a high- and medium-voltage electric station according to claim 3, characterized in that at least one optical voltage sensor is arranged inside at least one of said first or second set of three insulating posts.

19. The module for a high- and medium-voltage electric station according to claim 4, characterized in that at least one optical voltage sensor is arranged inside at least one of said first or second set of three insulating posts.

20. The module for a high- and medium-voltage electric station according to claim 6, characterized in that at least one optical voltage sensor is arranged inside at least one of said first or second set of three insulating posts.

* * * * *